(12) United States Patent
Browne et al.

(10) Patent No.: US 11,502,304 B2
(45) Date of Patent: Nov. 15, 2022

(54) CATALYSTS AND METHODS FOR LOWERING ELECTRODE PYROLYSIS TEMPERATURE

(71) Applicant: Enevate Corporation, Irvine, CA (US)

(72) Inventors: Ian Browne, Orange, CA (US); Benjamin Park, Mission Viejo, CA (US); Giulia Canton, Irvine, CA (US); Frederic Bonhomme, Lake Forest, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/679,138

(22) Filed: Nov. 8, 2019

(65) Prior Publication Data

US 2021/0143428 A1 May 13, 2021

(51) Int. Cl.
*H01M 4/00* (2006.01)
*H01M 4/62* (2006.01)
*H01M 4/04* (2006.01)
*H01M 4/02* (2006.01)

(52) U.S. Cl.
CPC ......... *H01M 4/625* (2013.01); *H01M 4/0404* (2013.01); *H01M 4/0471* (2013.01); *H01M 2004/027* (2013.01)

(58) Field of Classification Search
CPC .................................. H01M 4/00; C23C 16/00
See application file for complete search history.

(56) References Cited

U.S. PATENT DOCUMENTS

| 2009/0111031 A1* | 4/2009 | Hirose | H01M 4/622 429/332 |
| 2012/0113565 A1* | 5/2012 | Kim | H01G 11/24 361/502 |
| 2014/0287310 A1* | 9/2014 | Oono | H01M 4/625 429/221 |
| 2015/0076399 A1* | 3/2015 | Sugiyama | H01M 4/36 252/182.1 |
| 2018/0102543 A1* | 4/2018 | Su | H01M 4/661 |

(Continued)

FOREIGN PATENT DOCUMENTS

| CN | 103906416 | * | 7/2014 | |
| CN | 103050663 | * | 12/2016 | Y02E 60/10 |

(Continued)

OTHER PUBLICATIONS

"Phenolic Resin as an Inexpensive High Performance Binder for Li-Ion Battery Alloy Negative Electrodes", T. D. Hatchard,*P. Bissonnette, and M. N. Obrovac, Journal of The Electrochemical Society, 163 (9) A2035-A2039 (Year: 2016).*

(Continued)

*Primary Examiner* — David P Turocy
*Assistant Examiner* — Mohammad Mayy
(74) *Attorney, Agent, or Firm* — McAndrews, Held & Malloy, Ltd.

(57) ABSTRACT

Systems and methods are disclosed that provide for pyrolysis reactions to be performed at reduced temperatures that convert non-conductive precursor polymers to conductive carbon suitable for use in electrode materials, which may be incorporated into a cathode, an electrolyte, and an anode, where the pyrolysis method may include one or more catalysts or reactive reagents.

3 Claims, 5 Drawing Sheets

(56) References Cited

U.S. PATENT DOCUMENTS

2018/0248175 A1* 8/2018 Ghezelbash .......... H01M 4/364

FOREIGN PATENT DOCUMENTS

CN 108611706 * 10/2018
GB 1370366 A * 10/1974 ............... D01F 9/22

OTHER PUBLICATIONS

CN 108611706A, google patents (Year: 2018).*
CN103906416A, Google Patents (Year: 2014).*
CN 103050663 B, Google patents (Year: 2016).*
International Search Report, PCT/US2020/057940 dated Dec. 9, 2020, 8 pages.
International Preliminary Report on Patentability, PCT/US2020/057940, dated May 19, 2022, 7 pages.

* cited by examiner

CATALYSTS AND METHODS FOR LOWERING ELECTRODE PYROLYSIS TEMPERATURE

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system that provide for pyrolysis (i.e., carbonization), carbon-containing polymeric precursor compounds at temperatures that are reduced relative to the temperatures typically required to generate pyrolyzed conductive carbon material suitable for use in electrode materials.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for producing carbon suitable for use in electrode materials (e.g., anode) via pyrolysis of a non-conductive carbon source (e.g., polymer precursors that may include binders, and the like) at temperatures that are lower than temperatures typically required to convert, via pyrolysis reaction, such non-conductive carbon to a carbonized, conductive carbon material, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
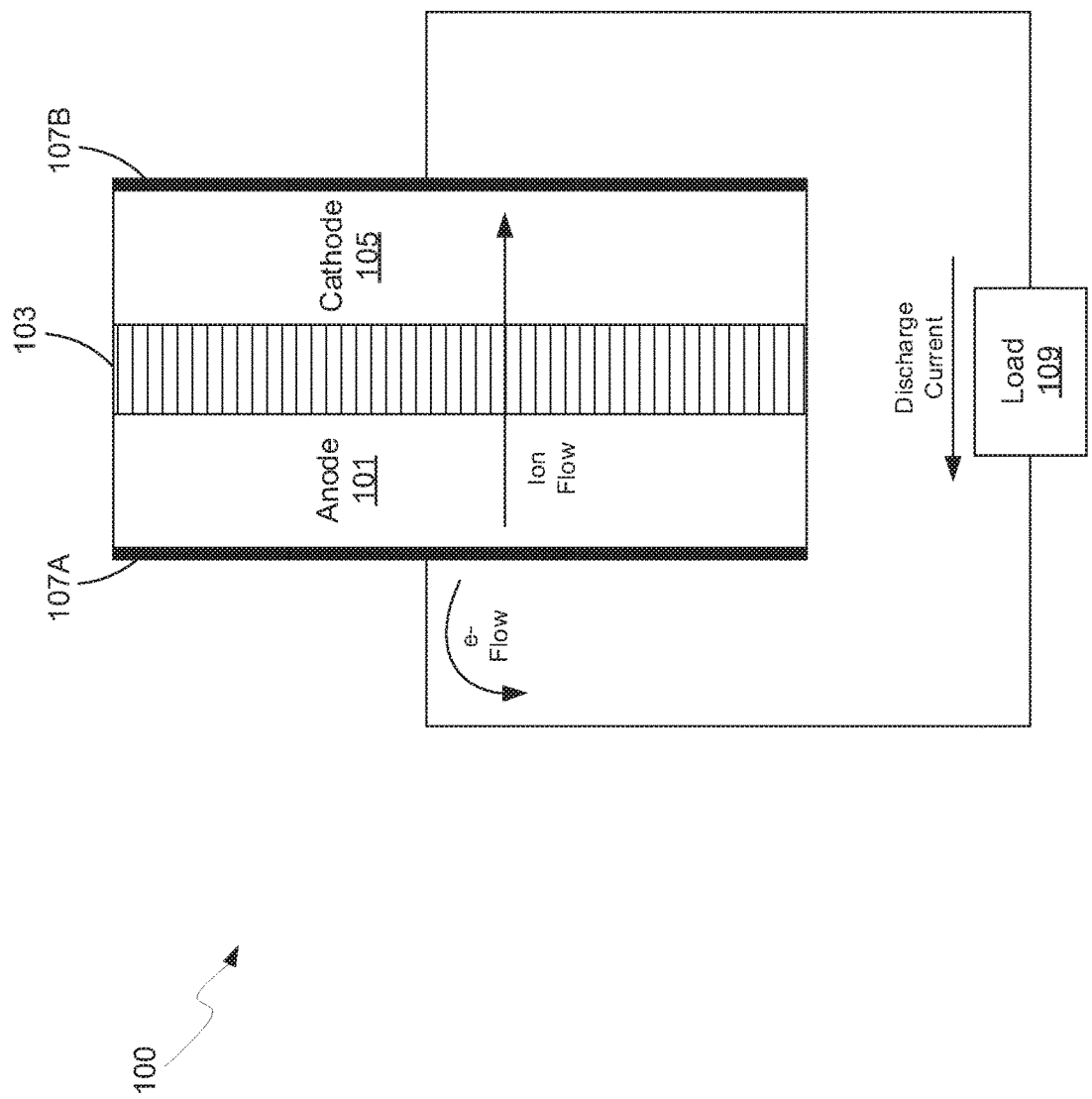
FIG. 1 is a diagram of a battery with anode expansion configured via silicon particle size, in accordance with an example embodiment of the disclosure.

FIG. 1 is a diagram of a battery with electrode materials (e.g., anode) that may be generated in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to the manufacturing challenges that may exist in standard techniques used to manufacture electrode active materials such as, for example, anodes (silicon carbon composites and silicon dominant composites) are provided by the method generally described herein. In some example embodiments, the disclosure relates to methods that provide for pyrolytic reactions that may be operated under conditions that are less resource intensive, less costly (e.g., require lower temperatures and less reaction time) when compared to typical pyrolysis reaction conditions, and less reactive with other electrode materials.

Figure 2:
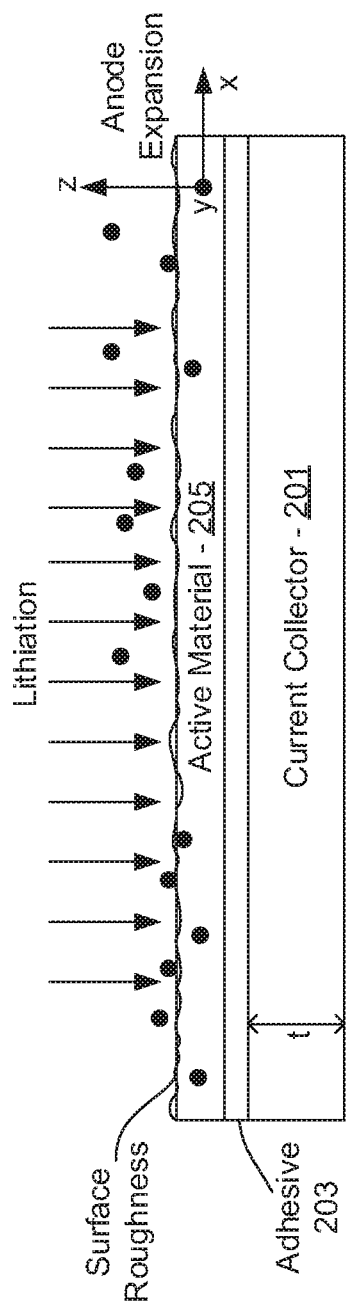
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Figure 3:
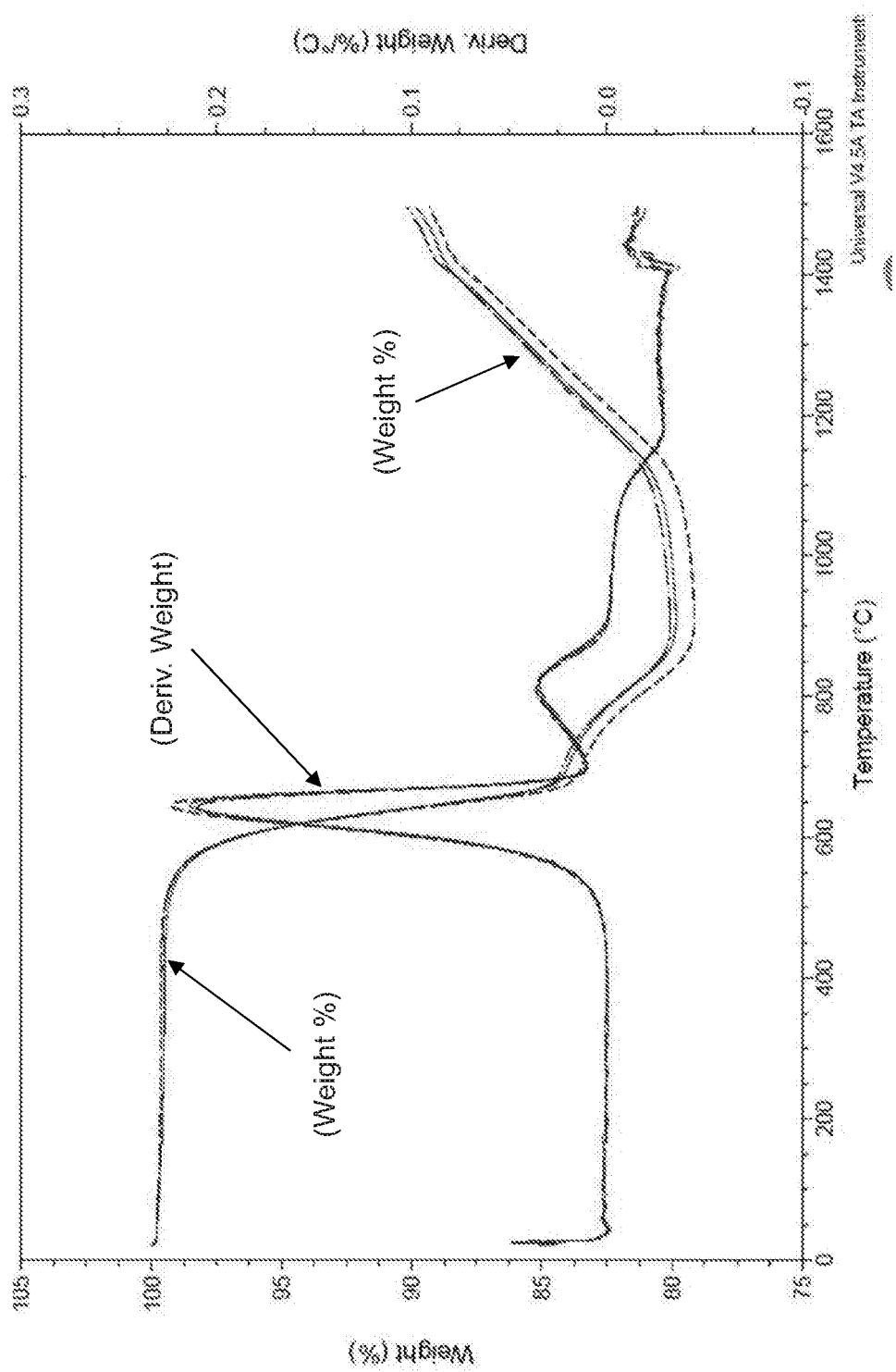
FIG. 3 depicts an example embodiment of a typical thermogravimetric analysis (TGA) that traces weight loss of a silicon carbon composite anode from dried form to pyrolyzed form, as a function of temperature. In accordance with an example embodiment of the disclosure, the method provides for substantial shifts in the curves to lower temperatures.

FIG. 3 is provided for purposes of reference and illustration of a typical TGA profile for a precursor polymer undergoing pyrolytic reaction. As reaction temperature increases (under constant pressure in this illustrative example) the weight percent of the material undergoes a relatively dramatic decrease (e.g., at just under 600° C. to about 650° C. in FIG. 3), followed by a much slower, but measurable decrease in weight percent (e.g., from about 700° C. to about 900° C. in FIG. 3). Once the weight percent loss stabilizes, the pyrolyzed carbon material exhibits decreased electrical resistance (or increased conductance) and may be identified as "carbonized" material (e.g., conductive glassy carbon or conductive hard carbon). Example embodiments of the method disclosed herein provide for the pyrolysis of precursor polymer to conductive carbon material, which may be measured by TGA, and exhibit a significant shift in the weight percent loss curve(s) toward lower temperatures.

Figure 4:
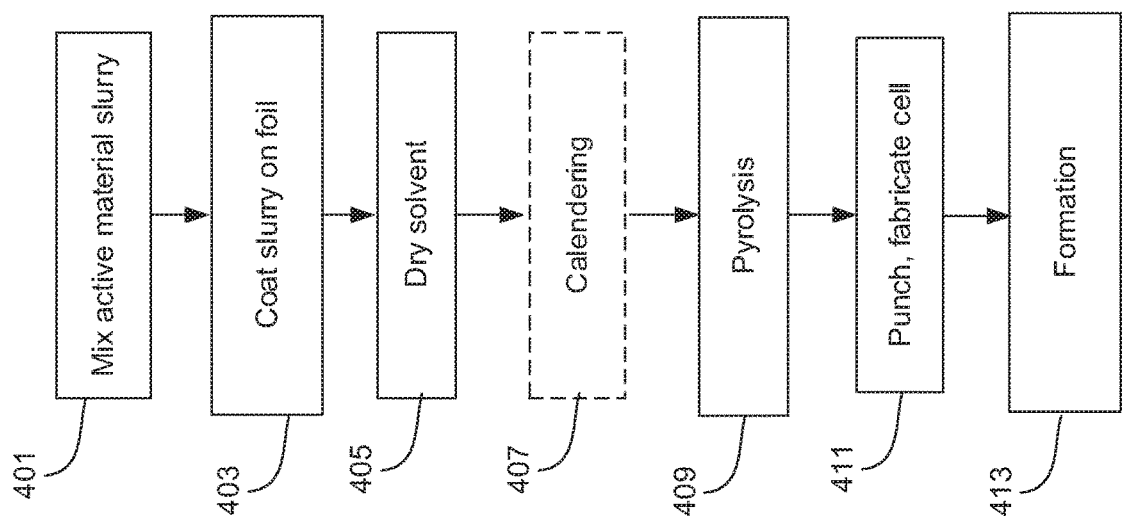
FIG. 4 is a flow diagram of a process for direct coating electrodes, in accordance with an example embodiment of the disclosure.

FIG. 4 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 5.

In step 401, the raw electrode active material may be mixed using a binder/resin (such as PI, PAI), solvent, and conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on the foil at a loading of, e.g., 3-4 mg/cm², which may undergo drying in step 405 resulting in less than 15% residual solvent content. In step 407, an optional calendering process may be utilized where a series of hard pressure rollers may be used to finish the film/substrate into a smoother and denser sheet of material.

In step 409, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400° C. Pyrolysis can be done either in roll form or after punching in step 411. If done in roll form, the punching is done after the pyrolysis process. The punched electrode may then be sandwiched with a separator and cathode with electrolyte to form a cell. In step 413, the cell may be subjected to a formation process, comprising initial charge and discharge steps to lithiate the anode, with some residual lithium remaining.

Figure 5:
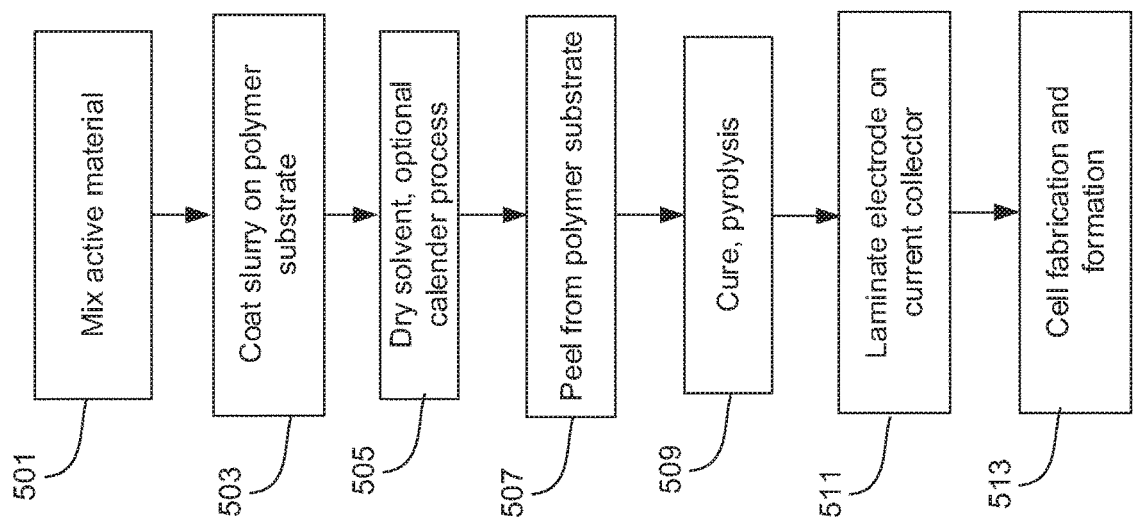
FIG. 5 is a flow diagram of an alternative process for lamination of electrodes, in accordance with an example embodiment of the disclosure.

FIG. 5 is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 12-16 hours, 200-240° C. for 4-6 hours). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining.

In an example embodiment of the disclosure, a method and system is described for reducing the temperature required for the pyrolytic conversion a non-conductive carbon source, in the presence of a catalyst or a reagent, to a conductive (carbonized) form of carbon. In typical pyrolysis reactions, the reactions are conducted under inert atmospheres at high temperatures, often requiring a temperature falling within a range of about 900° C.-1200° C. in order to achieve an effective conversion to conductive carbon (i.e., complete pyrolysis). Pyrolysis reactions are characterized by the thermal breaking of bonds and rearrangement of carbon atoms in the material undergoing pyrolysis, and exhibit a measurable mass loss attributed to removal of gaseous molecules comprising carbon, oxygen, hydrogen, and nitrogen that are driven off from the precursor material. Thermogravimetric analysis (TGA) can be used to measure the amount of mass loss in the material undergoing pyrolysis, typically observable at temperature ranges of 200° C.-700° C. (depending on carbon source and pyrolysis reaction conditions). Nevertheless, the carbonized material resulting from a typical pyrolysis reaction does not exhibit substantial conductivity (i.e., reduced resistance) until the reaction temperatures range well above 600° C. (e.g., above 700° C., 800° C., 900° C., 1000° C., 1100° C., or 1200° C. or more). At these elevated temperatures the observable weight loss of the carbonized material, while still measurable, is not as significant as observable weight loss at lower temperature ranges (400° C.-600° C.), and may be attributable to removal of hydrogen from partially pyrolyzed carbon material, which ultimately results in complete pyrolysis and conductive carbon. While existing methods can provide conductive carbon via pyrolysis of precursor polymer material, a number of disadvantages are associated with existing processes as they require extreme operating parameters (e.g., high temperatures), including high costs associated with large energy demand and prolonged operation time, longer manufacturing time, adverse reactions with other electrode materials, as well as greater safety risks for operators. The present disclosure realizes significant advantages by providing a method that can generate conductive carbon (e.g., glassy or hard carbon) via a complete pyrolysis reaction capable of operating at temperatures much lower relative to the temperatures required for previously described pyrolysis reactions.

Example embodiments of the method comprise reacting a precursor carbon source, such as a precursor polymer, with an amount of catalyst or a reagent under conditions that can facilitate, enhance, and/or accelerate the pyrolysis of the precursor carbon source and the removal of hydrogen from partially pyrolyzed carbon at temperatures that are lower than the temperatures required for typical pyrolysis reactions, to generate conductive carbonized material (i.e., glassy or hard carbon). In example embodiments of the method, the non-conductive "precursor carbon source" or "precursor polymer" (which are used interchangeably in the disclosure) can be any organic compound or composition (i.e., a material that comprises carbon). In some example embodiments, the precursor is a solid at typical ambient temperatures (e.g., room temperature). In some example embodiments the precursor may be soluble in solvents that are commonly used in the industry. In further example embodiments the precursor generally retains its shape and physical distribution when converted to pyrolytic carbon. In example embodiments the precursor polymer may be one or more of a binder, resin, adhesive, solvent, solution, gel, semi-solid, or solid material. Further non-limiting example embodiments of precursor polymer may include polyimide (PI), polyamideimide (PAI), NMP (N-Methyl-2-Pyrrolidone), polyvinylidene fluoride (PVDF), carboxymethyl cellulose (CMC), polyacrylic acid (PAA), styrene butadiene rubber (SBR), polypyrrole (PPy), poly(vinylidene fluoride)-tetrafluoroethylene-propylene (PVDF-TFE-P), polyethylene terephthalate (PET), polypropylene (PP), polyacrylonitrile, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polymethacrylic acid, nitrile-butadiene rubber, polystyrene, polycarbonate, phenolic resin, petroleum pitch, coal tar pitch, lignin, and a copolymer of vinylidene fluoride and hexafluoro propylene.

Some example embodiments of the method comprise mixing an amount of a catalyst or a reagent with active material (electrode (e.g., anode) active material) and a precursor polymer under conditions that form a slurry, as described herein, and reacting the slurry comprising the catalyst or the reagent, precursor polymer, and active material under conditions effective to perform a pyrolysis reaction.

Some example embodiments of the method comprise mixing an amount of a catalyst with a precursor polymer, and a carbon composite, carbon silicon composite, or silicon dominant carbon composite material, under conditions that form a slurry, as described herein, and reacting the slurry comprising the catalyst, precursor polymer, and composite material under conditions effective to perform a pyrolysis reaction.

Some example embodiments of the method comprise mixing an amount of a catalyst with a precursor polymer under conditions that form a slurry and reacting the slurry comprising the catalyst and precursor polymer under conditions effective to perform a pyrolysis reaction to generate a conductive carbonized material (e.g., glassy or hard carbon).

Some example embodiments of the method comprise mixing an amount of a catalyst with active material (electrode (e.g., anode) active material) including a binder under conditions that form a slurry, as described herein, and reacting the slurry comprising the catalyst and active material under conditions effective to perform a pyrolysis reaction.

Some example embodiments of the method comprise mixing an amount of a reagent with a precursor polymer, and a carbon composite, carbon silicon composite, or silicon dominant carbon composite material, under conditions that form a slurry, as described herein, and reacting the slurry comprising the reagent, precursor polymer, and composite material under conditions effective to perform a pyrolysis reaction.

Some example embodiments of the method comprise mixing an amount of a reagent with a precursor polymer under conditions that form a slurry and reacting the slurry comprising the reagent and precursor polymer under conditions effective to perform a pyrolysis reaction to generate a conductive carbonized material (e.g., glassy or hard carbon).

Some example embodiments of the method comprise mixing an amount of a reagent with active material (electrode (e.g., anode) active material) including a binder under conditions that form a slurry, as described herein, and reacting the slurry comprising the reagent and active material under conditions effective to perform a pyrolysis reaction.

In example embodiments, the method may be performed in a process for forming active material for an electrode such as, for example, an anode including a silicon-dominant anode. Thus, in some example embodiments the pyrolysis method may be used in a process for converting a mixture comprising a silicon carbon composite material and non-conductive carbon source (e.g., precursor polymer and/or binder) via pyrolysis, to active material comprising a silicon carbon composite material comprising silicon content of >50% (by weight) and, depending on the amount of carbon in the silicon carbon composite material, as much as 50% or more of the remainder of active material by weight (i.e., material that is not the >50% silicon) may be conductive carbon generated from the pyrolysis reaction.

As disclosed above, in example embodiments the majority or all the carbon in an anode active material, including carbon composite material and silicon carbon composite material, (e.g., for carbon, silicon carbon, and silicon-dominant anodes), may be derived by the pyrolysis method described herein for converting, in the presence of catalyst or reagent, a non-conductive carbon source (e.g., precursor polymer) to conductive carbon (e.g., glassy or hard carbon). In example embodiments, the pyrolysis may be performed under controlled reaction conditions. Some example embodiments comprise performing the pyrolysis reaction under a controlled atmosphere. Example embodiments of a controlled atmosphere may include an inert atmosphere in which an amount of atmospheric oxygen is purged, limited, or reduced, or in which atmospheric oxygen is removed from the pyrolysis reaction. Some example embodiments of the method comprise performing the pyrolysis reaction under a reduced pressure atmosphere, or under vacuum. In further example embodiments, the method may comprise performing the pyrolysis reaction under a partial pressure of catalyst provided as a gas.

In example embodiments, the pyrolysis method may be performed under reaction conditions comprising a temperature range that is lower than would be required to generate conductive carbon material by pyrolysis of the precursor polymer in the absence of catalyst. Some example embodiments of the method comprise performing the pyrolysis reaction to generate conductive carbon material at a temperature within a range of about 200° C. to about 900° C. (e.g., about 200° C., 300° C., 400° C., 500° C., 600° C., 700° C., 800° C., or 900° C.). In some example embodiments of the method the pyrolysis reaction to generate conductive carbon material is performed at a temperature within a range of about 300° C. to about 800° C. (e.g., about 300° C., 400° C., 500° C., 600° C., 700° C., or 800° C.). In some example embodiments of the method the pyrolysis reaction to generate conductive carbon material is performed at a temperature within a range of about 400° C. to about 750° C. (e.g., about 400° C., 450° C., 500° C., 550° C., 600° C., 650° C., 700° C., or 750° C.). In some example embodiments of the method the pyrolysis reaction to generate conductive carbon material is performed at a temperature within a range of about 300° C. to about 600° C., or about 300° C. to about 700° C., or about 400° C. to about 750° C., or about 400° C. to about 600° C., or about 500° C. to about 700° C., or about 500° C. to about 600° C. As discussed below, the reaction temperature may vary depending on the particular catalyst or reagent, and/or the particular precursor polymer included in the method.

In example embodiments, the method provides a pyrolysis reaction that may be performed for reaction times that are reduced relative to the reaction times that would be required to generate conductive carbon material by pyrolysis of the precursor polymer in the absence of catalyst. Some example embodiments comprise performing the pyrolysis reaction within a target temperature range for less than 5 hours, less than 4 hours, less than 3 hours, less than 2 hours, less than 1 hour, or for less than about 0.5 hours (i.e., less than 30 minutes, less than 20 minutes, less than 15 minutes, less than 10 minutes, or about or less than 5 minutes). As discussed in other example embodiments, the reaction time required for the pyrolysis reaction to generate conductive carbon material may vary depending on the particular catalyst or the particular reagent, and/or the particular precursor polymer included in the method.

In example embodiments the catalyst or the reagent included in the reaction can be any catalyst or reagent that is effective to reduce the temperature at which pyrolysis of a precursor carbon source, such as a precursor polymer, carbonizes the precursor to form conductive carbon. In some example embodiments the catalyst or reagent can be included as a homogeneous component (i.e., homogeneous catalyst or reagent) in the pyrolysis reaction such as, for example, mixing the catalyst or reagent with anode active material and precursor polymer carbon source to form a slurry. In some example embodiments the catalyst or reagent can be included as a heterogeneous component (i.e., heterogeneous catalyst or reagent) in the pyrolysis reaction such as, for example, applying to the surface of a solid catalyst or a solid reagent a slurry that includes anode active material and carbon (e.g., precursor polymer), applying a solid catalyst or reagent to the surface of the active material (e.g., spraying or broadcasting), or in alternative example embodiments reacting a slurry that includes anode active material and carbon with a partial pressure of a catalyst or reagent provided as a gas. In some other example embodiments the method may comprise the addition of catalyst or reagent after the initiation of the pyrolysis reaction (e.g., after observation of rapid, substantial mass loss), in order to accelerate and drive the reaction of any residual hydrogen from the partially pyrolyzed material.

In example embodiments the catalyst or reagent can be selected from commercially available alkali, alkaline, and transition metal catalysts or reactive metal reagents (e.g., from manufacturers such as Sigma Aldrich, BASF, WR Grace, Johnson Matthey, etc.). Some non-limiting example embodiments of the catalyst may include nickel and copper catalysts such as, for example $NiCl_2$, Al/Ni alloy, $Ni(acac)_2$, nickel acetate, nickelocene, $CuCl_2$, $Cu(acac)_2$, copper (II) acetate, and Tetrakis(acetonitrile)copper(I) tetrafluoroborate. In further example embodiments the catalyst or reagent may include metal halide-based chemicals (e.g., including fluorides, chlorides, bromides, and iodides of any one or more of Al, As, B, Be, Bi, Co, Cr, Cu, Fe, Hg, Mo, Nb, Os, Sb, Sn, Ta, Ti, Tl, W, Zn, and Zr) that may react with hydrogen and drive formation of conductive carbon. Additional example embodiments may comprise metal oxides, metal alloys, and other organometallic compounds that contain a transition metal. In some further example embodiments partial pressures of gases that are reactive with hydrogen (e.g., gases that include oxygen, sulfur, chlorine, nitrogen, etc.) may be included in the pyrolysis reaction in order to remove residual hydrogen in partially pyrolyzed precursor material. Particular care and caution should be taken when employing the example embodiments comprising reactive gases, in order to ensure proper venting and/or containment of potentially toxic and/or explosive reactants and reaction products. Accordingly, the example embodiments disclosed herein may provide catalysts, and alternative example embodiments may provide reactive reagents (e.g., gases) that may not function as a reaction "catalyst"; all such embodiments, however are encompassed for purposes of the method and example embodiments described herein.

In some example embodiments of the method, the amount of catalyst included in the pyrolysis reaction is effective to reduce the temperature required for pyrolysis to begin, reduce the temperature required for pyrolysis to complete, and/or reduce the temperature at which the precursor material is carbonized (i.e., the precursor conductivity increases and/or the resistance decreases). Thus, some example embodiments may provide a method wherein the heat required for pyrolysis of a particular precursor polymer (indicated by large weight loss of material) falls within a typical range for pyrolysis of that material (e.g., 200° C.-600° C.), but reduces the temperatures at which the carbonized material becomes conductive (e.g., below 700° C., 800° C., 900° C., 1000° C., 1100° C., or 1200° C.).

The amount of catalyst included in the method will vary depending on the catalyst (e.g., heterogeneous or homogeneous, reactivity, regenerative capacity, whether it is consumed by reaction, etc.), the precursor material that will undergo pyrolysis, and the way the catalyst is incorporated in the reaction. In some example embodiments the amount of catalyst may be included from about 0.0001 mol % to about 100 mol % (e.g., 0.0001, 0.001, 0.01, 0.1, 1.0, 10, or 100 mol %) relative to the amount of precursor material that undergoes pyrolysis. In example embodiments that encompass the consumption of a catalyst material (i.e., as more of a reactant than true catalyst) the method may include molar excess of the consumed catalyst (reactant) material, relative to the amount of precursor material (e.g., 1×, 1.5×, 2×, 5×, or 10× or more molar excess). In alternative embodiments, the amount of catalyst included in the method may be expressed as weight percent (based on the amount of precursor material) and may vary widely in light of the highly variable density and molar mass of the reaction materials.

In some example embodiments, the disclosure provides a method for forming a silicon carbon composite material that comprises reacting an amount of catalyst with a precursor polymer under conditions that are effective to pyrolyze the precursor polymer, in accordance with the methods herein described.

In some example embodiments, the disclosure provides a method for forming a silicon carbon electrode active material as generally depicted in FIG. 4 and/or FIG. 5, wherein method includes a pyrolysis reaction that comprises an amount of catalyst that is reacted under conditions that are effective to pyrolyze the precursor polymer, in accordance with the methods herein described. In further example embodiments, the disclosure provides a method for forming a silicon carbon anode as generally depicted in FIG. 4 and/or FIG. 5, wherein method includes a pyrolysis reaction that comprises an amount of catalyst that is reacted under conditions that are effective to pyrolyze the precursor polymer, in accordance with the methods herein described.

In some example embodiments, the disclosure provides for conductive carbonized material (e.g., glassy or hard carbon) that is produced in accordance with the pyrolysis methods herein described. In some example embodiments, the disclosure provides for electrode active material that is produced in accordance with the pyrolysis methods herein described. In some further example embodiments, the disclosure provides for an anode comprising carbon composite, carbon silicon composite, and/or silicon dominant carbon composite active material that is produced in accordance with the pyrolysis methods herein described. In yet further example embodiments, the disclosure provides for a battery comprising any of the conductive carbonized material, electrode active material, and/or anode that is produced in accordance with the pyrolysis methods herein described.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of making an electrode active material comprising:
   forming an electrode active material directly on a current collector, said forming comprising:
   mixing together components comprising carbon, silicon powder, and a carbon precursor polymer to form a slurry;
   coating the slurry directly on the current collector; and
   reacting an amount of a catalyst or a reagent with said electrode active material under conditions effective to pyrolyze the carbon precursor polymer to conductive carbon; wherein said catalyst or reagent is a copper catalyst selected from the group consisting of $Cu(acac)_2$ and Tetrakis(acetonitrile)copper(I) tetrafluoroborate; and
   wherein the carbon precursor polymer is polyimide (PI) or polyamideimide (PAI); and
   wherein the conditions comprise utilizing one or more temperatures within a temperature range of about 400° C. to about 750° C.

2. A method of forming an anode, the method comprising:
   mixing raw anode active material comprising a silicon powder with an amount of a catalyst, carbon precursor polymer, and solvent to form a slurry;
   coating the slurry directly onto a substrate;
   drying the slurry to remove the solvent; and
   reacting the dried slurry comprising the catalyst and raw anode active material under conditions effective to convert the carbon precursor polymer to conductive carbon; wherein said catalyst is a copper catalyst selected from the group consisting of $Cu(acac)_2$ and Tetrakis(acetonitrile)copper(I) tetrafluoroborate; and
   wherein the carbon precursor polymer is polyimide (PI) or polyamideimide (PAI); and
   wherein the conditions comprise utilizing one or more temperatures within a temperature range of about 400° C. to about 750° C.

3. The method according to claim 2, wherein the substrate comprises a current collector comprising at least one of copper, aluminum, or titanium.

* * * * *